Patented Apr. 30, 1940

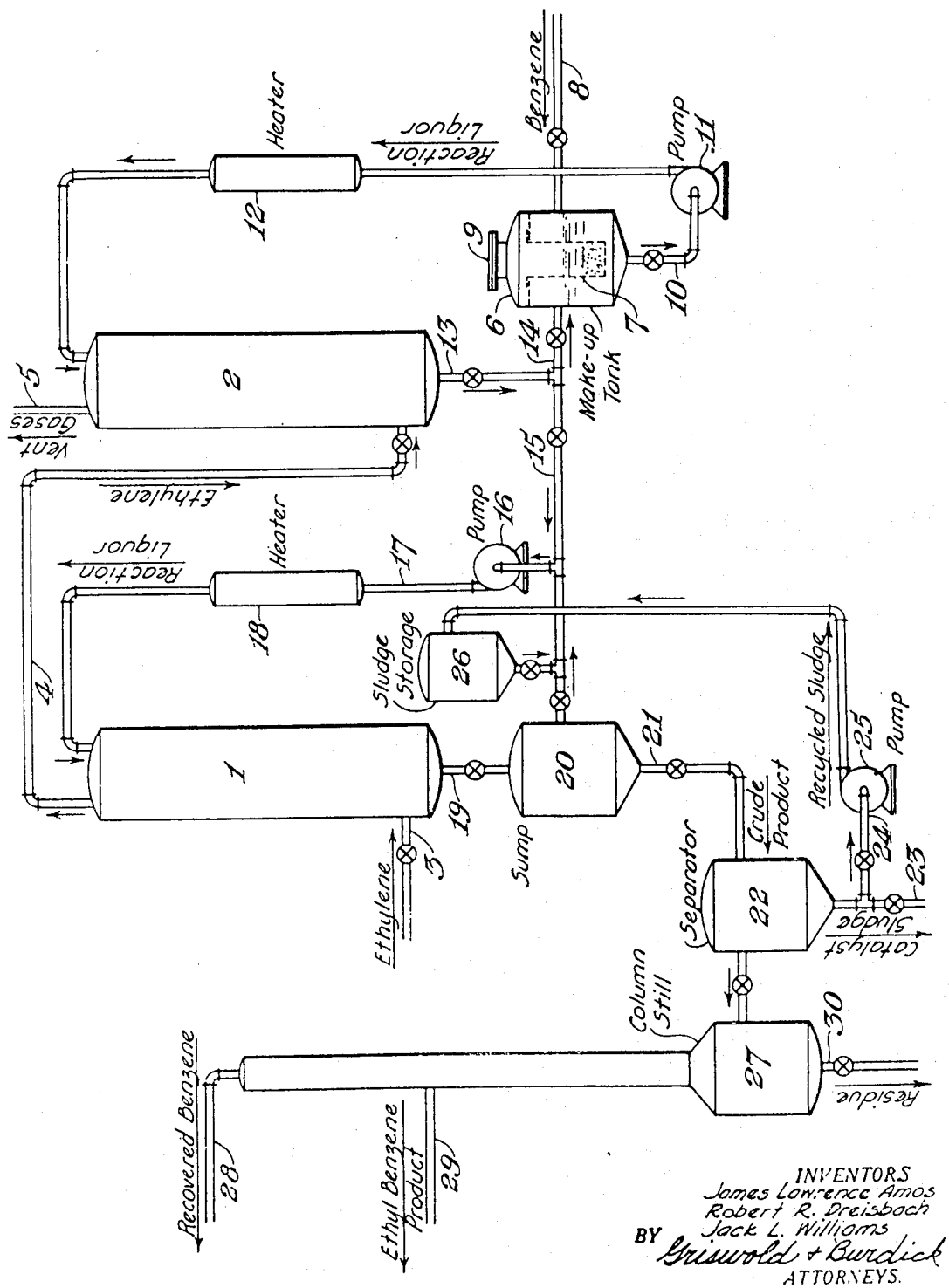

2,198,595

UNITED STATES PATENT OFFICE 2,198,595

PROCESS FOR THE ALKYLATION OF AROMATIC COMPOUNDS

James L. Amos, Robert R. Dreisbach, and Jack L. Williams, Midland, Mich., assignors to The Dow Chemical Company, Midland, Mich., a corporation of Michigan Application April 12, 1938, Serial No. 201,647

6 Claims. (Cl. 260—671)

The present invention concerns an improved method of reacting gaseous alkylating agents with aromatic compounds. More particularly it relates to a continuous process for preparing mono-alkyl benzenes by reaction of olefins with benzene in the presence of an alkylation catalyst of the Friedel-Crafts type.

The preparation of alkylated aromatic compounds on a commercial scale is frequently carried out by batchwise reaction of gaseous alkylating agents with aromatic compounds in the presence of alkylation catalysts such as organo-metal halide complexes of the Friedel-Crafts type. In such preparation several factors operate to affect the efficiency and economy of the process. Thus the activity of the catalyst in promoting alkylation does not remain constant but instead gradually declines with continued use, so that the latter stages of the reaction are conducted at reduced efficiency. Further, the activity of the catalyst is markedly decreased by the presence of even traces of certain impurities or "poisons," e. g., water, sulfur, poly-olefin tars, etc., in the gaseous alkylating agent. Since the removal of these impurities is rarely accomplished because of the expense or difficulty involved, the catalyst must be replenished or reactivated at frequent intervals and cannot satisfactorily be re-used in subsequent reactions. Insofar as we are aware no alkylation process, either batch or continuous, which successfully avoids these difficulties has heretofore been devised.

An object of the present invention is to provide a continuous process for reacting gaseous alkylating agents with aromatic compounds, wherein the catalyst is employed at maximum activity and with improved efficiency. Another object is to provide a means for maintaining the catalyst at maximum activity and for protecting it against "poisoning." Still another object is to provide a means for effectively re-using partially spent catalyst. Other objects will be apparent from the description which follows.

In furtherance of these objects we have discovered that the continuous reaction of a gaseous alkylating agent with an aromatic compound may be carried out with improved efficiency and increased catalyst economy by successively contacting the alkylating agent with a reaction mixture, comprising the aromatic compound and catalyst, in each of a series of recirculatory reaction systems as explained below. The invention, then, consists in the method hereinafter fully described and more particularly pointed out in the claims, the annexed drawing and following description setting forth in detail but several of the ways in which the principle of the invention may be employed.

In said annexed drawing the single figure is a diagrammatic representation of one arrangement of apparatus adapted for operating the process of the invention and of the flow of materials in such apparatus.

For purposes of illustration, the process will be explained with reference to the reaction of ethylene and benzene in the presence of an aluminum chloride complex catalyst as representative, respectively, of the gaseous alkylating agents, aromatic compounds, and catalysts which may be employed, although it will be appreciated that the invention is not limited to the use of these particular compounds. The alkylation takes place in tower systems 1 and 2, which may be filled with packing, or other means for securing intimate contact of the reactants. Ethylene is introduced continuously into the base of tower 1 through valve-controlled line 3, and rises countercurrent to a descending reaction liquor comprising benzene and catalyst. Part of the ethylene reacts to form ethyl benzene, and the remainder of the gas escapes through line 4 to the base of tower 2. In tower 2 such remaining ethylene again meets a descending reaction liquor comprising benzene and catalyst and further reacts to form ethyl benzene. Unreacted gas passes off through vent 5.

The tower 2 reaction liquor is formed and the organo-metal halide complex catalyst is replenished in make-up tank 6, in which is suspended a wire-screen basket 7 containing solid aluminum chloride. The fresh benzene to be alkylated enters tank 6 through line 8 and mixes therein with recycled reaction liquor from tower 2 introduced through line 14. The liquid level in tank 6 is maintained at such a height that the solid aluminum chloride in basket 7 is substantially all immersed and thus gradually reacts with the surrounding liquor to form an organo-metal halide complex catalyst. The aluminum chloride in basket 7 may be replenished from time to time as needed by removing cover plate 9 and dropping in additional solid material. The reaction liquor formed in tank 6 is drawn off through line 10 and forced by pump 11 through heater 12, wherein the temperature of the liquor is raised to about 30° to 70° C., and thence to the top of tower 2. This liquor then flows downwardly through tower 2, wherein it is met by ascending ethylene, as hereinbefore mentioned, and thence out through drain 13. Part of the liquor leaving tower 2 is returned through lines 13 and 14 to make-up tank 6 to be re-cycled, as already explained, and part is withdrawn continuously through line 15. This latter portion is combined with a second mixture comprising benzene and catalyst from sump 20, and the second reaction liquor thus formed is forced by pump 16 through line 17 and heater 18, wherein the temperature of the liquor is raised to 30° to 70° C. and thence to the top of tower 1. The reaction liquor flows downwardly through tower 1, wherein it reacts with ascending fresh ethylene, and thence through drain 19 to sump 20. Part of the liquor in sump 20 is recycled to the top of tower 1 by pump 16 and the remainder is withdrawn continuously as crude product through valve controlled line 21. This crude product passes through separator 22, where the catalyst is separated out as a heavy sludge which may be removed through line 23 or may be returned for re-use in the tower 1 reaction system by way of line 24, pump 25 and sludge storage tank 26. The clarified crude reaction product leaving separator 22 is fractionally distilled in continuous column still 27, the unreacted benzene, finished mono-ethyl benzene, and high-boiling residue being withdrawn through lines 28, 29 and 30, respectively. The recovered benzene may, if desired, be re-employed in the process.

It will be noted that the process just described consists essentially in conducting the ethylation in a series of two recirculatory reaction systems, viz. the system comprising tower 1, sump 20 and pump 16 and the system comprising tower 2, tank 6 and pump 11. During operation the reaction liquor in each reaction system is re-cycled continuously; a portion of the tower 1 liquor is continuously withdrawn from sump 20 as crude product; a portion of the tower 2 liquor is transferred to the tower 1 system; and the tower 2 liquor is continually replenished by fresh benzene and catalyst. In contrast to this continuous circulatory flow of the benzene reaction liquors, the ethylene passes once through the tower 1 system, wherein a part of said gas reacts to form ethyl benzene, and then once through tower 2 system, wherein the remaining ethylene is substantially all reacted. In carrying out our process, it is not essential that the reaction of ethylene with the benzene reaction liquor in each of the tower 1 and 2 systems be carried out countercurrent; the ethylene and benzene in each system may be contacted in any desired way, e. g., by introducing the ethylene and reaction mixture into a suitable mixing box at the top of each tower and allowing the mixture to flow downwardly through the tower.

In the process described, fresh catalyst is introduced into the tower 2 reaction system by continuously recycling at least part of the tower 2 reaction liquor into contact with solid aluminum chloride. In this way the entire catalyst in such system is maintained at high activity, and the alkylation therein is conducted at exceptional efficiency. In addition, as will be explained below, practically no catalyst poisons enter the tower 2 system and the entire catalyst in the system retains its activity for a considerable time. As a result the quantity of solid aluminum chloride required to replenish the tower 2 catalyst is relatively small and the catalyst economy of the system is high. On the other hand, in normal operation little if any fresh catalyst is added to the reaction liquor in the tower 1 system, except when beginning operation. Instead, the catalyst being recycled in such system is continuously replenished by the partially used but still active catalyst suspended in the liquor entering from the tower 2 system. Further, in most alkylations at least a portion of the nearly spent catalyst removed as sludge from the crude reaction product by separator 22 is returned to the tower 1 system. As a result of this re-use of nearly spent catalyst, the catalyst economy of the tower 1 system is also high. Thus the tower 2 system operates with a catalyst maintained at high activity and the tower 1 system operates with a used and hence a less active catalyst, so that both towers operating together as shown have unusual over-all catalyst economy.

The economical re-use of less active catalyst is made feasible in the present process by the fact that the reaction temperatures and catalyst concentrations in each of the two tower systems are susceptible of independent control. Thus the lowered reaction rate in the tower 1 system, which might result from using a less active catalyst, may be compensated by adjusting heater 18 to raise the reaction temperature in such system. The same compensation may be achieved by using a larger proportion of catalyst in the tower 1 system, i. e., by returning more catalyst sludge from separator 22.

The re-use of less active catalyst in the tower 1 system has other advantages in addition to that of economy. Thus in any alkylation wherein an olefin is the gaseous alkylating agent, the catalyst employed not only promotes alkylation but also tends to induce polymerization of the olefin reactants; freshly prepared catalyst is particularly active in this respect. This tendency toward polymerization is minimized in the present process since the entering olefin first contacts the tower 1 reaction liquor containing the least active catalyst. The unreacted olefin which leaves tower 1 is relatively dilute, and although in tower 2 it contacts a reaction liquor containing highly active alkylation catalyst, little polymerization of such olefin occurs because of its low concentration. Another advantage of the present process is that the tower 1 system in effect serves as a scrubber or purifier for the entering gaseous alkylating agent. Any impurities such as water, sulfur, halogenated aliphatic hydrocarbons, poly-olefin tars, etc., which may be present in a gaseous alkylating agent from commercial sources, and which tend to "poison" a highly active catalyst, are thus removed from the entering gas by contact with tower 1 reaction liquor. The efficiency of alkylation in the tower 1 system is not seriously diminished by these impurities since the catalyst in the tower 1 liquor is less active and hence less subject to "poisoning." In addition, large proportions of nearly spent catalyst may be recycled, if desired, to insure satisfactory alkylation even in the presence of a considerable proportion of impurities. As a result of such purification, the alkylating agent entering tower 2 has no tendency to "poison" the catalyst in this latter system, and as mentioned above such catalyst remains at maximum activity for a relatively long period of time.

In the process as described, the fresh catalyst is formed and introduced into the tower 2 reaction system by contacting a mixture of the recycled reaction liquor and fresh aromatic compound with a bed of solid catalyst, viz., in basket 7 suspended in tank 6. This mode of adding the catalyst may at times, however, be inapplicable. For example, in certain alkylations according to the present invention it may be desirable to omit recycling the liquor in the tower 2 system, although of course recycling the partially spent catalyst in the tower 1 system as hereinbefore explained. In such instance the complex catalyst may be added in any other suitable way, e. g., by forming a liquid organo-metal halide complex catalyst sludge by reaction of a metallic halide of the Friedel-Crafts type with an aromatic compound in a separate stage, and introducing such sludge into the tower 2 reaction system at any desired point.

Although our new process is particularly adapted to the use of organo-metal halide complex catalysts of the Friedel-Crafts type, especially aluminum chloride complexes, other alkylation catalysts such as sulfuric acid, sulfonic acids, zinc chloride, acid-activated bleaching earths, etc. may be employed. Such catalysts may be used in a manner analogous to that described above with reference to aluminum chloride.

In general, alkylation according to the present method is applicable to the reaction of any gaseous alkylating agent, e. g., a lower olefin or alkyl halide, with any aromatic compound capable of being alkylated by such agent in the presence of a catalyst, e. g., hydrocarbons such as benzene and its homologues, halo-hydrocarbons, phenols, etc. The alkylation of solid compounds may be carried out by dissolving such compound in any suitable inert solvent. The gaseous alkylating agent need not be, and usually is not, employed pure, but may be mixed with other gaseous alkylating agents or with inert gases such as air, saturated gaseous hydrocarbons, etc.

Although our new process has been described as being conducted in a series of two recirculating reaction systems, i. e., two reaction towers, it will be appreciated that a series of three or more such systems may be employed without departing from the spirit of the invention. To summarize, then, our new continuous alkylation process consists essentially in reacting a gaseous alkylating agent in successive stages with reaction liquors each comprising an aromatic compound and an alkylation catalyst, continuously recycling and re-using the alkylation catalyst in the first stage, introducing aromatic compound and alkylation catalyst into the reaction liquor of the last stage, withdrawing at least a portion of the reaction liquor from each stage except the first and introducing it into the next preceding stage, and withdrawing a portion of the reaction liquor from the first stage as crude product.

Other modes of carrying out the process of our invention may be employed in addition to those hereinbefore described, change being made as regards the details of operation, provided the steps stated in any of the following claims or the equivalent of such stated steps be employed.

We therefore particularly point out and distinctly claim as our invention:

1. In a continuous process for reacting an aromatic compound capable of being alkylated in the presence of a Friedel-Crafts alkylation catalyst with a gaseous alkylating agent containing impurities which tend to deactivate said catalyst, the steps which comprise reacting said alkylating agent in successive stages with reaction liquors each comprising said aromatic compound and a Friedel-Crafts catalyst, continuously recirculating a substantial proportion of the catalyst in the first stage into re-use in the said stage, introducing aromatic compound and fresh catalyst into the reaction liquor of the last stage, withdrawing at least a portion of the reaction liquor from each stage except the first and introducing it into the next preceding stage, and withdrawing a portion of the reaction liquor from the first stage as crude product.

2. In a continuous process for reacting an aromatic compound capable of being alkylated in the presence of a Friedel-Crafts alkylation catalyst with a gaseous alkylating agent containing impurities which tend to deactivate said catalyst, the steps which comprise reacting said alkylating agent in successive stages with reaction liquors each comprising said aromatic compound and a Friedel-Crafts catalyst, continuously recirculating the reaction liquor in each stage into contact with additional alkylating agent entering said stage, introducing aromatic compound and alkylation catalyst into the reaction liquor of the last stage, withdrawing a portion of the reaction liquor from each stage except the first and introducing it into the next preceding stage, and withdrawing a portion of the reaction liquor from the first stage as crude product.

3. In a continuous process for reacting an aromatic compound capable of being alkylated in the presence of a Friedel-Crafts alkylation catalyst with a gaseous alkylating agent containing impurities which tend to deactivate said catalyst, the steps which comprise reacting said alkylating agent in two successive stages with reaction liquors each comprising said aromatic compound and a Friedel-Crafts alkylation catalyst, continuously recirculating the reaction liquor in each stage into contact with additional alkylating agent entering such stage, introducing aromatic compound and alkylation catalyst into the reaction liquor of the last stage, withdrawing a portion of the reaction liquor from the last stage and introducing into the first stage, and withdrawing a portion of the reaction liquor from the first stage as crude product.

4. In a continuous process for reacting an aromatic hydrocarbon in the presence of a Friedel-Crafts alkylation catalyst with a gaseous olefin containing impurities which tend to deactivate said catalyst, the steps which comprise reacting said olefin in successive stages with reaction liquors each comprising said aromatic hydrocarbon and said alkylation catalyst, continuously recirculating the reaction liquor in each stage into contact with additional olefin entering such stage, introducing aromatic hydrocarbon and alkylation catalyst into the reaction liquor of the last stage, withdrawing a portion of the reaction liquor from each stage except the first and introducing it into the next preceding stage, and withdrawing a portion of the reaction liquor from the first stage as crude product.

5. In a continuous process for reacting benzene in the presence of an aluminum chloride ethylation catalyst of the Friedel-Crafts type with ethylene containing impurities which tend to deactivate said catalyst, the steps which comprise reacting said ethylene in successive stages with reaction liquors each comprising benzene and alkylation catalyst, continuously recirculating the reaction liquor in each stage into contact with additional ethylene entering said stage, introducing benzene and fresh alkylation catalyst to the reaction liquor of the last stage, withdrawing a portion of the reaction liquor from each stage except the first and introducing it into the next preceding stage, withdrawing a portion of the reaction liquor from the first stage as crude product, and separating ethyl benzene therefrom.

6. In a continuous process for reacting an aromatic compound capable of being alkylated in the presence of a Friedel-Crafts alkylation catalyst with a gaseous alkylating agent containing impurities which tend to deactivate said catalyst, the steps which comprise contacting said alkylating agent in a first stage with a first reaction liquor comprising partially alkylated aromatic compound and partially spent alkylation catalyst, recirculating said first reaction liquor into contact with additional fresh alkylating agent in said first stage, withdrawing unreacted alkylating agent from said first stage and subsequently in a second stage contacting the same with a second reaction liquor comprising unalkylated aromatic compound and fresh alkylation catalyst, recirculating said second reaction liquor in the second stage into contact with the unreacted alkylating agent, introducing aromatic compound and catalyst into the second reaction stage, withdrawing a portion of the reaction liquor from said second stage and introducing it into the first stage, and removing a portion of the reaction liquor from said first stage as crude product.

JAMES L. AMOS.
ROBERT R. DREISBACH.
JACK L. WILLIAMS.